US010151582B1

(12) United States Patent
Jovenall

(10) Patent No.: US 10,151,582 B1
(45) Date of Patent: Dec. 11, 2018

(54) SYSTEMS AND METHODS FOR MONITORING LOCOMOTIVE WHEEL SIZE

(71) Applicant: LAIRD TECHNOLOGIES, INC., Earth City, MO (US)

(72) Inventor: Jeremy Jovenall, Mercer, PA (US)

(73) Assignee: Laird Technologies, Inc., Earth City, MO (US)

( * ) Notice: Subject to any disclaimer, the term of this patent is extended or adjusted under 35 U.S.C. 154(b) by 0 days.

(21) Appl. No.: 15/848,459

(22) Filed: Dec. 20, 2017

(51) Int. Cl.
*G01M 17/10* (2006.01)
*G01B 11/10* (2006.01)

(52) U.S. Cl.
CPC ........... *G01B 11/105* (2013.01); *G01M 17/10* (2013.01)

(58) Field of Classification Search
CPC ...... G01B 11/14; G01B 11/08; G01M 17/013; G01M 17/08; G01M 17/10
See application file for complete search history.

(56) References Cited

U.S. PATENT DOCUMENTS

| 5,793,492 | A | 8/1998 | Vanaki | |
|---|---|---|---|---|
| 9,469,318 | B2 | 10/2016 | Kanner et al. | |
| 2004/0056496 | A1* | 3/2004 | Kenderian | G01M 17/10 295/8 |
| 2007/0043486 | A1* | 2/2007 | Moffett | G01B 21/02 701/31.4 |
| 2008/0007724 | A1* | 1/2008 | Chung | B61K 9/08 356/237.1 |

FOREIGN PATENT DOCUMENTS

| DE | 19825594 A1 | 12/1998 |
|---|---|---|
| DE | 19827271 A1 | 12/1999 |
| EP | 1422119 A1 | 5/2004 |
| JP | S63209401 A | 8/1988 |
| JP | 2012020734 A | 2/2012 |
| KR | 20060090517 A | 8/2006 |
| WO | WO-201432992 A1 | 3/2014 |

OTHER PUBLICATIONS

Cheng et al., A Novel Online Detection System for Wheelset Size in Railway Transportation, Hindawl Publishing Corporation, Journal of Sensors, vol. 2016, Article ID 9507213, 15 pages, http://dx.doi.org/10.1155/2016/9507213, Copyright 2016, 14 pages.
Automatic In-Track Wheel Profile Measurement System, Beena Vision Systems Inc., dated 2014, 2 pages.
Wheel Parameters, http://www.mermecgroup.com/inspect/train-monitoring/87/wheel-parameters.php, Apr. 21, 2017, 3 pages.
Interferometry Explained; Laser interferometry as a well established method for measuring distances with great accuracy, RENISE, 2001-2017, 4 pages.

* cited by examiner

*Primary Examiner* — Jonathan Hansen
(74) *Attorney, Agent, or Firm* — Harness, Dickey & Pierce, P.L.C.; Anthony G. Fussner

(57) ABSTRACT

According to various aspects, exemplary embodiments are disclosed of systems and methods for monitoring locomotive wheel size. In an exemplary embodiment, a system generally includes at least one distance measurement device coupled to a locomotive and configured to measure a distance to a rail when a locomotive wheel is positioned on the rail. The system is configured to use the distance to the rail as measured by the at least one distance measurement device to determine a diameter of the locomotive wheel.

20 Claims, 2 Drawing Sheets

SYSTEMS AND METHODS FOR MONITORING LOCOMOTIVE WHEEL SIZE

FIELD

The present disclosure generally relates to systems and methods for monitoring locomotive wheel size.

BACKGROUND

This section provides background information related to the present disclosure which is not necessarily prior art.

On the railroad, a conventional manual task exists to measure and record the size of the locomotive wheels. The wheel diameter has an acceptable range such that maintenance is required if the wheel diameter falls outside of this range. In North America, for example, the diameter of a new locomotive wheel is 42 inches, which wheel diameter decreases over time due to wear and tear of travel along a rail. When the wheel diameter is 36 inches or less, the wheel must be replaced.

DRAWINGS

The drawings described herein is for illustrative purposes only of a selected embodiment and not all possible implementations, and are not intended to limit the scope of the present disclosure.

Corresponding reference numerals indicate corresponding parts throughout the several views of the drawings.

DETAILED DESCRIPTION

Figure 1:
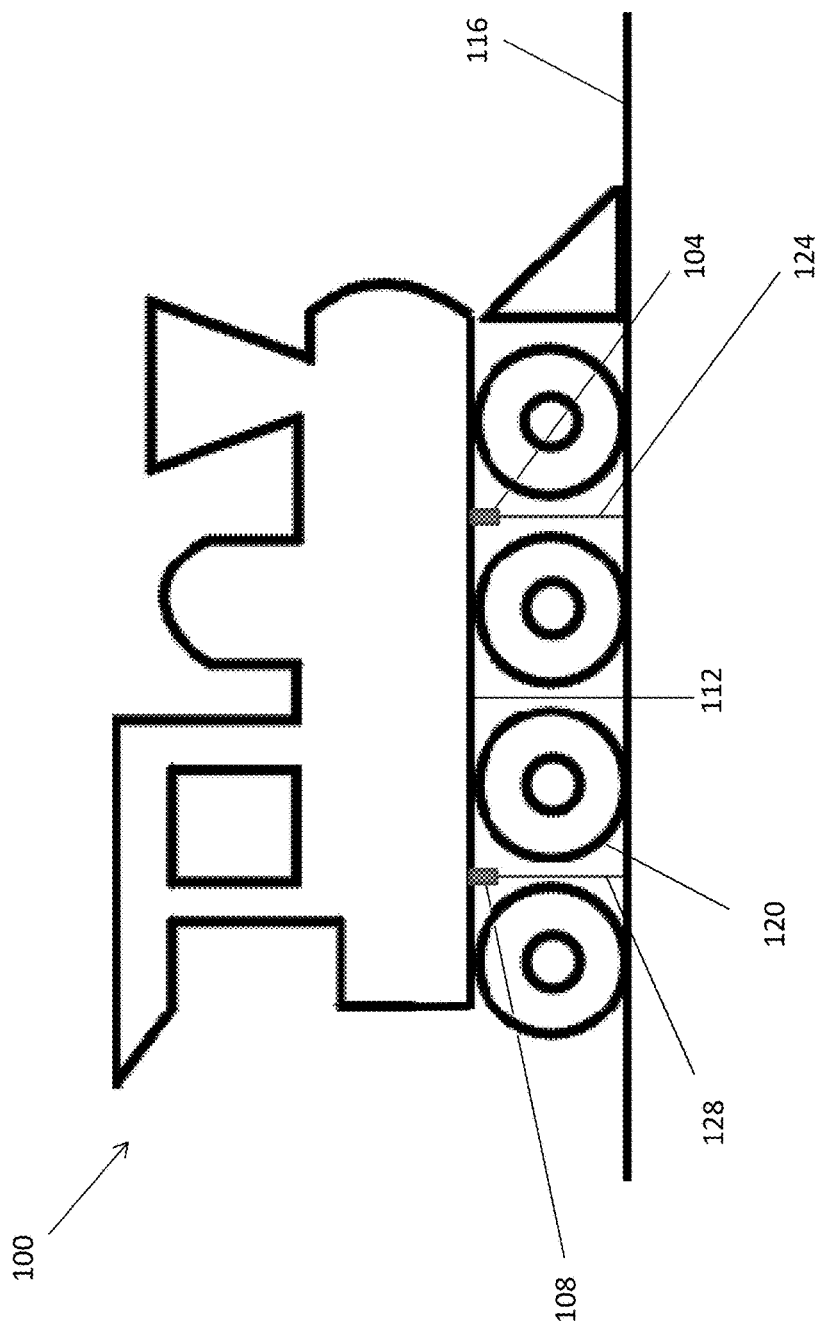
FIG. 1 shows a locomotive and a system for monitoring locomotive wheel size according to an exemplary embodiment.
Figure 2:
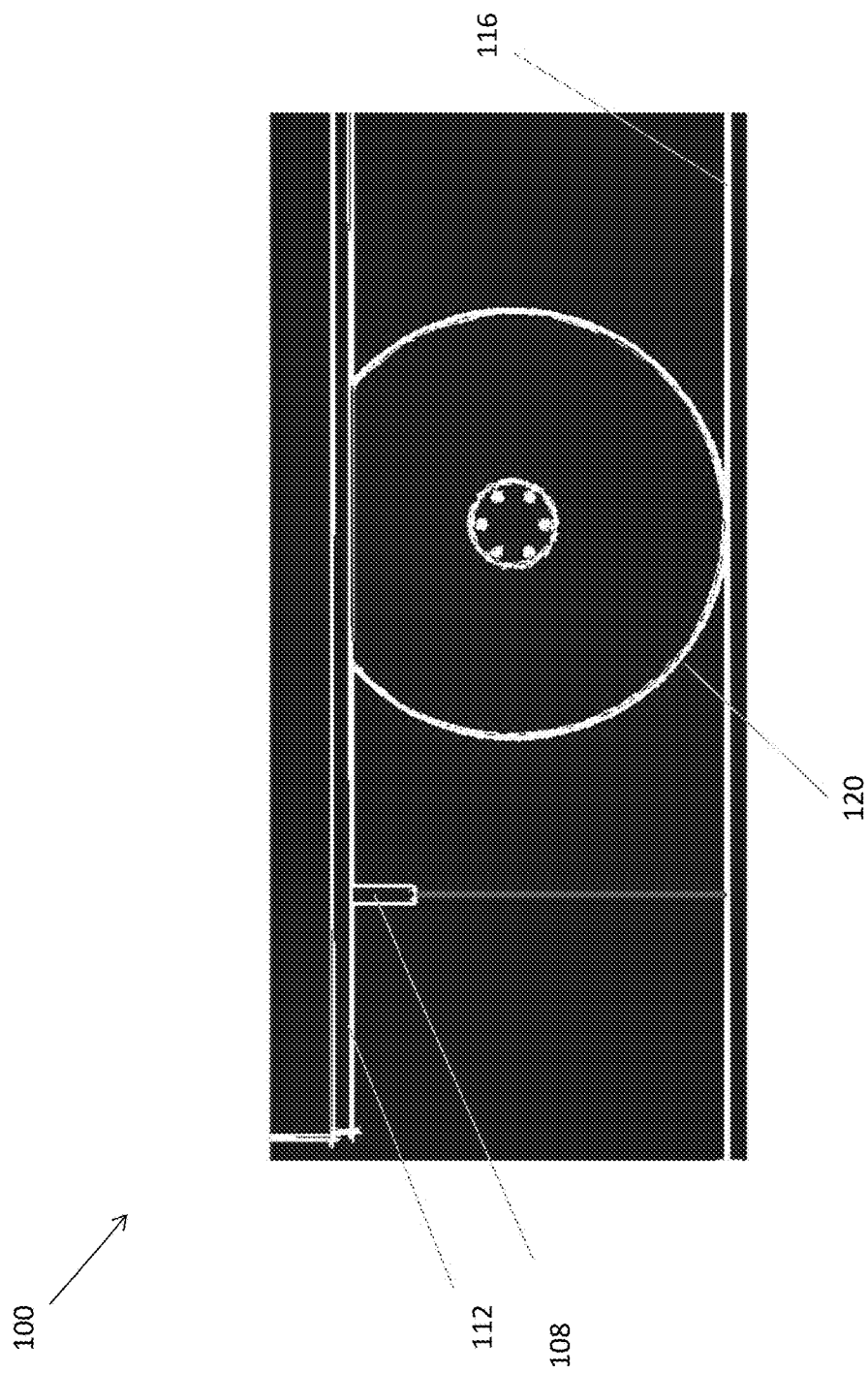
FIG. 2 shows a portion of the locomotive and wheel size monitoring system shown in FIG. 1.

Example embodiments will now be described more fully with reference to the accompanying drawings.

Speed indications in the locomotive cab as well as modern control systems use the wheel diameter to determine the wheel circumference, which circumference is then used to translate axle rotations of the wheel to ground speed. Traditionally, locomotive wheel size has been estimated, which tends to be relatively imprecise thereby diluting the precision of the speedometer and odometer derived from the estimated wheel size.

Disclosed herein are exemplary embodiments of systems and methods for monitoring locomotive wheel size. In exemplary embodiments, at least one distance measurement device (broadly, a device) is used for measuring a distance (e.g., a device height above, etc.) to a rail on which a locomotive wheel is positioned. The device may be coupled (e.g., mounted via a bracket, bezel, and mechanical fasteners, etc.) to a frame of a locomotive at a location above (e.g., directly above, etc.) the rail. The device may measure (e.g., automatically, dynamically, periodically, etc.) the height of the device above (broadly, the distance to) the rail at predetermined times or intervals (e.g., one or more times per day, when the locomotive speed is below a predetermined speed, when the locomotive is stationary or stopped, etc.). The height measurements may be recorded and compared to each other to determine if there has been any change in the height of the device above the rail.

During operation of the locomotive, the diameters of the locomotive wheels decrease (e.g., each at about the same rate, etc.) due to wear and tear on the locomotive wheels. As the wheel diameter decreases, the height of the locomotive frame (and height of the device coupled to the locomotive frame) above the rail will decrease by the same amount that the wheel diameter decreased. Accordingly, analyzing the measurement(s) from the device may reveal that the device height above the rail (or distance from the device to the rail) has decreased. For example, a distance measurement from the device may be compared to an initial device height measurement (e.g., manually measured with a tape measure, etc.) to determine the extent of any change in height. Or, for example, the device may be configured (e.g., preprogrammed and activated, etc.) to measure the height or distance to the rail at predetermined and/or regular intervals, which measurements may be recorded and compared to determine the extent of any change in height.

The device height reduction would correspond with or equal the reduction in height of the locomotive frame above the rail, which, in turn, corresponds with or equals the reduction in wheel diameter. The decrease in wheel diameter may be subtracted from the previously determined or known wheel diameter (e.g., 42 inches for a new wheel in North America, etc.) to obtain the updated decreased wheel diameter. For example, if there is a 2 inch decrease between the device's first distance measurement (e.g., 44 inches, etc.) and a second subsequent distance measurement (e.g., 42 inches, etc.), then the wheel diameter has also decreased by 2 inches (e.g., from 42 inches to 40 inches, etc.). Accordingly, the height measurements obtained by the device may thus be used to indirectly determine the wheel diameter reduction, which, in turn, may be used to determine the up-to-date decreased wheel diameter.

In some exemplary embodiments, first and second devices (e.g., a redundant set of identical or different devices, etc.) may be used to independently measure first and second heights, respectively, that the first and second devices are above a rail. The first and second height measurements may be compared with each other to validate and confirm the accuracy of the height measurements. For example, the first and second devices may be coupled to the locomotive frame such that the first and second devices are about the same height above the rail. In this example, the height measurement from the first device should be equal or about equal to (e.g., within a predetermined (+/−) acceptable tolerance of, etc.) the height measurement from the second device.

The first and second (or front and back) devices may be respectively disposed at, adjacent, or closer towards the opposite first and second (or front and back) ends of the locomotive. For example, the first device may be closer to a front or forward end of the locomotive than is the second device. Conversely, the second device may be closer to a back or reverse end of the locomotive than the first device. The first and second devices may be along the same right or left side (or starboard and port side) of the locomotive frame. In which case, the first and second devices are positioned above the same rail.

In alternative embodiments, the first and second devices may be positioned along opposite right and left sides of the locomotive frame such that the first and second devices are positioned above different rails. In this example, the first and second devices may be positioned directly across from each other at about the same distance from the front end of the locomotive. Or, for example, either the first or second device may be positioned closer to the front or back end of the locomotive than the other one of the first and second devices. In yet alternative embodiments, the system may include a single device above one of the two rails and two or more devices above the opposite rail. In further alternative embodiments, the system may include two or more devices along each side of the locomotive above each rail.

The first and second devices may comprise any one or more of an interferometer (e.g., a laser interferometer, etc.), a photoelectric sensor, a video recognition device, a combination thereof, other sensing units, other sensors, other electronic automated means for measuring distance, etc.

In some exemplary embodiments, one or more distance measurement devices may be aligned with or located at the top of the locomotive wheel(s). In this example, distance measured by the device would correspond with (e.g., equal, etc.) the diameter of the locomotive wheel(s). In other exemplary embodiments, one or more distance measurement devices may be aligned with or located at a same height as the center of the locomotive wheel(s). In this latter example, distance measured by the device would correspond with (e.g., are equal, etc.) the radius of the locomotive wheel(s).

In some exemplary embodiments, first and second distance measurement devices are coupled (e.g., mounted via brackets, bezels, and mechanical fasteners, etc.) to a frame of the locomotive above (e.g., directly above, etc.) the rail on which are positioned the right or starboard side wheels of the locomotive. In this example, the first and second distance measurement devices are positioned above the same rail. Although additional distance measurement devices may be positioned above the other rail, this is not required as the diameters of the locomotive wheels will decrease at about the same rate due to wear and tear.

In alternative embodiments, additional distance measurement devices (e.g., third and fourth laser interferometers, etc.) may be coupled to the opposite side of the frame above the other rail on which are positioned the left or port side wheels of the locomotive, e.g., for redundancy, for improved accuracy, in case one or more other devices fail or become inoperable, etc. For example, first and second distance measurement devices along the locomotive's first side may be used for monitoring the diameter of the locomotive wheels along the first side of the locomotive, and third and fourth distance measurement devices along the locomotive's second side may be used for monitoring the diameter of the locomotive wheels along the second side of the locomotive.

The sensors and other sensitive electronic components of the distance measurement devices may be protected from the environment (e.g., dust, dirt, water, weather elements, etc.) when not in use. For example, the sensors and other sensitive electronic components of the distance measurement devices may be enclosed within protective housings that have an openable/closeable protective element or cover (e.g., shutter, etc.). For example, an openable/closeable shutter (broadly, a cover or protective element) may be provided that is opened to expose a sensor and/or other portion(s) (e.g., light source, laser, wave emitter, etc.) of a distance measurement device when the distance measurement device is queued and about to be used. The shutter may be closed to conceal and protect the sensor and/or other portion(s) of the distance measurement device when the distance measurement device and not about to used.

At installation and during periodic calibrations, the distance measurement device(s) may be electronically adjusted to help ensure that the distance to rail as measured by the device is accurately determined. For example, the distance to rail as measured by the device may be compared to a distance manually measured using a tape measure. If the distance measurements are not equal or not within a predetermined (+/−) acceptable tolerance of each other, then the distance measurement device should be electronically adjusted and calibrated. After calibration, the distance measurement device(s) may be activated (e.g., automatically without user intervention, manually, etc.) at predetermined times and/or regular intervals (e.g., when train is stationary or stopped, etc.) to measure and record the distance from the device to the rail. The distance measurements from the device may then be used to calculate the wheel diameter.

Data validations may be performed prior to acceptance of the measurements from the device for calculating the wheel diameter. For example, a data validation may include determining whether or not the difference between consecutive measurements by the device is too large for the amount of time that elapsed between the two measurements (e.g., not enough time for the wheel diameter to have decreased by that large of an amount due to wear and tear, etc.). If the reading or measurement from the sensor or device is outside of an expected range in either direction, this is indicative of either a bad read, sensor damage, and/or a calibration issue and the reading or measurement could be discarded. This is due to the fact that the locomotive wheel will wear (and the diameter will decrease) at a very slow rate. Another data validation may include wheel size being equal to a reading or measurement from the sensor or device plus a calibration constant initially determined at installation and updated periodically. An increase in detected wheel size should only occur when the wheels are changed, so the system will be able to detect and flag this event for confirmation by the user. All readings from the wheel size sensors or distance measurement device may occur when the locomotive is stationary. A reading that exceeds the expected range, but then exceeds another limit could be a sign of catastrophic damage to the track or a locomotive derailment. This information may be compared to one or more other devices (e.g., kinematic sensor arrays, etc.) for further data validation.

With reference now to the figures, FIG. 1 shows a locomotive 100 including a system for monitoring locomotive wheel size according to an exemplary embodiment. As shown, first and second (or front and back, forward and reverse) laser interferometers 104, 108 (broadly, distance measurement devices) are coupled (e.g., mounted via brackets, bezels, and mechanical fasteners, etc.) to a frame 112 of the locomotive 100 above the rail 116 on which are positioned the right or starboard side wheels 120 of the locomotive 100.

In this exemplary embodiment, the laser interferometers 104, 108 may be positioned directly above the rail 116 and oriented such that the lasers 124, 128 from the respective laser interferometers 104, 108 strike the rail 116. The first laser interferometer 104 is coupled to the locomotive frame 112 at a first location that is closer to a front or forward end of the locomotive 100 than is the second location at which the second device 108 is coupled to the locomotive frame 112. Conversely, the second device 108 is closer to a back or reverse end of the locomotive 100 than is the first device 104.

The first and second laser interferometers 104, 108 are positioned above the same rail. Although additional laser interferometers or other distance measurement devices may be positioned above the other rail, this is not required as the diameters of the locomotive wheels 120 will decrease at about the same rate due to wear and tear. In alternative embodiments, one or more laser interferometers or other distance measurement devices may be coupled to the opposite side of the locomotive frame 112 above the other rail on which are positioned the left or port side wheels of the locomotive 100, e.g., for redundancy, for improved accuracy, in case one or more other devices fail or become inoperable, etc.

In operation, the first and second laser interferometers 104, 108 measure the distance to the rail 116, which may correspond to the first and second heights of the laser interferometers 104, 108 above the rail. These measurements may then be used to determine the diameter of the locomotive wheel 120.

During operation of the locomotive 100, the diameters of the locomotive wheels 112 decrease (e.g., each at about the same rate, etc.) due to wear and tear on the locomotive wheels 112. As the wheel diameter decreases, the heights of the locomotive frame 112 and laser interferometers 104, 108 above the rail will decrease by the same amount that the wheel diameter decreased. Accordingly, analyzing the measurements from the laser interferometers 104, 108 may reveal that the frame and device heights above the rail (or distance to the rail) has decreased. For example, the distance measurements from the laser interferometers 104, 108 may be compared to an initial device height measurement (e.g., manually measured with a tape measure, etc.) to determine the extent of any change in height. Or, for example, the laser interferometers 104, 108 may be configured (e.g., preprogrammed and activated, etc.) to measure the heights or distances to the rail at predetermined and/or regular intervals, which measurements may be recorded and compared to determine the extent of any change in height.

The change in height of the laser interferometers 104, 108 would correspond with or equal the reduction in height of the locomotive frame 112 above the rail, which, in turn, corresponds with or equals the reduction in wheel diameter. The decrease in wheel diameter may be subtracted from the previously determined or known wheel diameter (e.g., 42 inches for a new wheel in North America, etc.) to obtain the updated decreased wheel diameter. Accordingly, the measurements obtained by the laser interferometers 104, 108 may thus be used to indirectly determine the wheel diameter reduction, which, in turn, may be used to determine the up-to-date decreased wheel diameter.

Embodiments disclosed herein may provide one or more (or none) of the following advantage, such as providing automated, dynamic, and accurate updates of locomotive wheel size via one or more devices mounted to the frame of the locomotive above (e.g., directly above, etc.) the rail without requiring any trackside equipment or track-mounted hardware. By providing automated, dynamic, and accurate updates of locomotive wheel size, exemplary embodiments disclosed herein allow for increased accuracy and precision of locomotive speed detectors and odometers that rely upon the wheel circumference and axle rotation to determine speed and distance traveled.

For example, the wheel diameter may be determined (e.g., automatically, dynamically, etc.) at regular and/or predetermined intervals (e.g., once or twice per day, in real time, when the locomotive speed is below a predetermined speed, when the locomotive is stopped or stationary, etc.), to thereby detect and/or provide accurate updates on decreased wheel diameter. The accurate, up-to-date wheel diameter may then be used to calculate an accurate, up-to-date wheel circumference, which, in turn, may be used for translating (e.g., more accurately, etc.) wheel axle rotations to ground speed and distance traveled.

The capability of providing accurate, up-to-date wheel diameter may be used for tracking wheel wear for maintenance scheduling. For example, the system may be configured to provide an alert that the locomotive wheels need replaced when the wheel diameter is determined to be less than and/or equal to a predetermined minimum size (e.g., 36 inch diameter in North America, etc.), etc.

Exemplary embodiments may include a processor and a memory coupled to (and in communication with) the processor. The processor may include one or more processing units (e.g., in a multi-core configuration, etc.) such as, and without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

In exemplary embodiments, the memory may be one or more devices that permit data, instructions, etc., to be stored therein and retrieved therefrom. The memory may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, and/or any other type of volatile or nonvolatile physical or tangible computer-readable media.

In exemplary embodiments, computer-executable instructions may be stored in the memory for execution by the processor to particularly cause the processor to perform one or more of the functions described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the functions or processes described herein.

In exemplary embodiments, a network interface may be coupled to (and in communication with) the processor and the memory. The network interface may include, without limitation, a wired network adapter, a wireless network adapter, a mobile network adapter, or other device capable of communicating to one or more different networks. In some exemplary embodiments, one or more network interfaces may be incorporated into or with the processor.

It should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or databases and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: using the distance to the rail as measured by the at least one distance measurement device to determine a decrease in the distance to the rail that corresponds to and is caused by a decrease in a diameter of the locomotive wheel; and using the decrease in the distance to the rail to determine an updated diameter of the locomotive wheel.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purposes of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances. Whether or not modified by the term "about", the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for monitoring locomotive wheel size, the system comprising at least one distance measurement device coupled to a locomotive and configured to measure a distance to a rail when a locomotive wheel is positioned on the rail, the system configured to:

use the distance to the rail as measured by the at least one distance measurement device to determine a decrease in the distance to the rail that corresponds to a decrease in a diameter of the locomotive wheel; and
use the decrease in the distance to the rail to determine an updated diameter of the locomotive wheel.

2. The system of claim 1, wherein
the system is configured to automatically determine the updated diameter of the locomotive wheel by subtracting the decrease in the distance to the rail from a previous diameter of the locomotive wheel; and/or
the system is configured to automatically determine the decrease in the distance to the rail by subtracting the distance to the rail as measured by the at least one distance measurement device from a prior measurement of the distance to the rail.

3. The system of claim 1, wherein the system is configured to automatically determine the decrease in the distance to the rail by subtracting the distance to the rail as measured by the at least one distance measurement device from a prior measurement of the distance to the rail previously measured by the at least one distance measurement device.

4. The system of claim 1, wherein:
the at least one distance measurement device is mounted to a frame of the locomotive at a location such that the at least one distance measurement device is above the rail on which the locomotive wheel is positioned; and
the decrease in the distance to the rail corresponds to a decrease in a height of the frame above the rail due to the decrease in the diameter of the locomotive wheel.

5. The system of claim 1, wherein the at least one distance measurement device comprises at least one laser interferometer mounted to a frame of the locomotive at a location such that the at least one laser interferometer is directly above the rail on which the locomotive wheel is positioned and operable for producing a laser to strike the rail.

6. The system of claim 1, wherein:
the at least one distance measurement device comprises first and second laser interferometers mounted to a frame of the locomotive and oriented such that first and second laser interferometers are operable for producing lasers that strike the rail on which the locomotive wheel is positioned;
the first laser interferometer is configured to determine a first distance from the first laser interferometer to the rail on which the locomotive wheel is positioned; and
the second laser interferometer is configured to determine a second distance from the second laser interferometer to the rail on which the locomotive wheel is positioned; and
the system is configured to use the first and/or second distances to determine the updated diameter of the locomotive wheel.

7. The system of claim 6, wherein:
the system is configured to compare the first and second distances to validate and confirm accuracy of the first and second distances, and then use the validated first and/or second distances to determine the updated diameter of the locomotive wheel; and/or
the first and second laser interferometers are mounted to the frame of the locomotive along a same side of the locomotive; and/or
the first laser interferometer is mounted to the frame of the locomotive at a first location that is closer to a front of the locomotive than a second location at which the second laser interferometer is mounted to the frame of the locomotive.

8. The system of claim 1, wherein:
the system is configured to automatically determine the updated diameter of the locomotive wheel without requiring or using any trackside equipment or track-mounted hardware to determine the updated diameter of the locomotive wheel; and
the system is configured to automatically determine the updated diameter of the locomotive wheel at predetermined intervals and/or when the locomotive is stationary.

9. The system of claim 1, wherein:
the system is configured to use the updated diameter and axle rotations of the locomotive wheel to determine a speed of the locomotive and/or a distance traveled by the locomotive;
and/or the system is configured to provide an alert when the updated diameter of the locomotive wheel is at or below a predetermined minimum size.

10. The system of claim 1, wherein the at least one distance measurement device comprises means for measuring distance to the rail on which the locomotive wheel is positioned, without requiring or using any trackside equipment or track-mounted hardware.

11. The system of claim 1, wherein:
the system is configured to automatically determine the updated diameter of the locomotive wheel by subtracting the decrease in the distance to the rail from a previous diameter of the locomotive wheel;
the system is configured to automatically determine the decrease in the distance to the rail by subtracting the distance measurement from the at least one distance measurement device from a prior distance measurement to the rail;
the at least one distance measurement device comprises first and second laser interferometers mounted to a frame of the locomotive and oriented such that first and second laser interferometers are operable for producing lasers that strike the rail on which the locomotive wheel is positioned and such that the first and second laser interferometers are operable for determining first and second distances, respectively, to the rail whereby decreases in the first and second distances to the rail from the first and second laser interferometers correspond to a decrease in a height of the frame above the rail due to the decrease in the diameter of the locomotive wheel; and
the system is configured to automatically determine the updated diameter of the locomotive wheel at predetermined intervals and/or when the locomotive is stationary, without requiring or using any trackside equipment or track-mounted hardware to determine the updated diameter of the locomotive wheel.

12. The system of claim 1, wherein the system is further configured to allow electronic adjustment to the at least one distance measurement device for calibration when the distance to the rail as measured by the at least one distance measurement device does not correspond with or equal a predetermined calibration distance to the rail.

13. The system of claim 1, wherein the system is configured to perform one or more data validations before accepting the distance to the rail as measured by the at least distance one measurement device, the one or more data validations including:
a determination whether or not the distance to the rail as measured by the at least distance one measurement device exceeds a predetermined distance range; and/or a determination whether or not a wheel size equal to a sum of the distance to the rail as measured by the at least distance one measurement device and a calibration constant exceeds a predetermined wheel size range.

14. The system of claim 1, wherein the system comprises a non-transitory computer-readable storage media including computer-executable instructions, which when executed by at least one processor, cause the at least one processor to:
   automatically use the distance to the rail as measured by the at least one distance measurement device to determine the decrease in the distance to the rail; and
   automatically use the decrease in the distance to the rail to determine the updated diameter of the locomotive wheel.

15. A system for monitoring locomotive wheel size, the system comprising at least one distance measurement device mounted to a frame of a locomotive and configured to measure a distance to a rail when a locomotive wheel is positioned on the rail, the system configured to use the distance to the rail as measured by the at least one distance measurement device to automatically determine a diameter of the locomotive wheel.

16. The system of claim 15, wherein the system is configured to:
   automatically determine a decrease in the distance to the rail that corresponds to a decrease in the diameter of the locomotive wheel by subtracting the distance to the rail as measured by the at least one distance measurement device from a prior measurement of the distance to the rail; and
   automatically determine the diameter of the locomotive wheel by subtracting the decrease in the distance to the rail from a previous diameter of the locomotive wheel.

17. The system of claim 15, wherein the system is configured to automatically determine a diameter of the locomotive wheel by adding the distance to the rail as measured by the at least distance one measurement device and a calibration constant.

18. The system of claim 15, wherein:
   the at least one distance measurement device comprises first and second laser interferometers mounted to the frame of the locomotive and oriented such that first and second laser interferometers are operable for producing lasers that strike the rail on which the locomotive wheel is positioned and such that the first and second laser interferometers are operable for determining first and second distances, respectively, to the rail whereby decreases in the first and second distances to the rail from the first and second laser interferometers correspond to a decrease in a height of the frame above the rail due to the decrease in the diameter of the locomotive wheel; and
   the system is configured to automatically determine the diameter of the locomotive wheel at predetermined intervals and/or when the locomotive is stationary, without requiring or using any trackside equipment or track-mounted hardware to determine the diameter of the locomotive wheel.

19. A method of monitoring locomotive wheel size, the method comprising using a distance to a rail on which a locomotive wheel is position as measured by at least one distance measurement device mounted to a frame of a locomotive to automatically determine a diameter of the locomotive wheel.

20. The method of claim 19, wherein the method includes using laser interferometry to measure the distance to the rail; and/or wherein the method includes:
   automatically determining a decrease in the distance to the rail that corresponds to a decrease in the diameter of the locomotive wheel by subtracting the distance to the rail as measured by the at least one distance measurement device from a prior measurement of the distance to the rail; and
   automatically determining the diameter of the locomotive wheel by subtracting the decrease in the distance to the rail from a previous diameter of the locomotive wheel.

* * * * *